(12) United States Patent
Challener et al.

(10) Patent No.: US 8,797,274 B2
(45) Date of Patent: Aug. 5, 2014

(54) COMBINED TAP SEQUENCE AND CAMERA BASED USER INTERFACE

(75) Inventors: David C. Challener, Raleigh, NC (US); James S. Rutledge, Durham, NC (US); Jinping Yang, Beijing (CN)

(73) Assignee: Lenovo (Singapore) Pte. Ltd., Singapore (SG)

(*) Notice: Subject to any disclaimer, the term of this patent is extended or adjusted under 35 U.S.C. 154(b) by 1247 days.

(21) Appl. No.: 12/325,257

(22) Filed: Nov. 30, 2008

(65) Prior Publication Data
US 2010/0134421 A1 Jun. 3, 2010

(51) Int. Cl.
*G06F 3/042* (2006.01)
*G09G 5/00* (2006.01)
*G06F 3/041* (2006.01)

(52) U.S. Cl.
USPC ............................ 345/173; 345/156; 345/175

(58) Field of Classification Search
CPC ..... G06F 3/042; G06F 3/0421; G06F 3/0425; G06F 3/043; G06F 3/0433; G06F 3/0428; G06F 2203/04106
USPC .......................................... 345/156–184, 104
See application file for complete search history.

(56) References Cited

U.S. PATENT DOCUMENTS

| 5,982,352 | A * | 11/1999 | Pryor ............................... 345/156 |
|---|---|---|---|
| 7,515,138 | B2 * | 4/2009 | Sullivan .......................... 345/173 |
| 7,834,855 | B2 * | 11/2010 | Hotelling et al. .............. 345/173 |
| 8,022,941 | B2 * | 9/2011 | Smoot ............................. 345/175 |
| 8,130,202 | B2 * | 3/2012 | Levine et al. .................. 345/173 |
| 2002/0021287 | A1 * | 2/2002 | Tomasi et al. .................. 345/168 |
| 2003/0174125 | A1 * | 9/2003 | Torunoglu et al. ............. 345/168 |
| 2006/0190836 | A1 * | 8/2006 | Ling Su et al. ................ 715/773 |
| 2006/0289760 | A1 * | 12/2006 | Bathiche ........................ 250/332 |
| 2007/0070046 | A1 * | 3/2007 | Sheynblat et al. ............. 345/173 |
| 2007/0152976 | A1 * | 7/2007 | Townsend et al. ............. 345/173 |
| 2008/0001929 | A1 * | 1/2008 | Wulff ............................. 345/175 |
| 2008/0122803 | A1 * | 5/2008 | Izadi et al. ..................... 345/175 |
| 2008/0211779 | A1 * | 9/2008 | Pryor ............................. 345/173 |
| 2009/0073128 | A1 * | 3/2009 | Marsden ........................ 345/168 |
| 2010/0013799 | A1 * | 1/2010 | Kim et al. ...................... 345/177 |
| 2010/0060611 | A1 * | 3/2010 | Nie ................................ 345/175 |
| 2010/0214267 | A1 * | 8/2010 | Radivojevic et al. .......... 345/175 |
| 2011/0080349 | A1 * | 4/2011 | Holbein et al. ................ 345/173 |

* cited by examiner

*Primary Examiner* — Alexander Eisen
*Assistant Examiner* — Patrick F Marinelli
(74) *Attorney, Agent, or Firm* — Ference & Associates LLC

(57) ABSTRACT

The invention includes a method, apparatus, and program storage device for providing a combined tap sequence and camera based user interface. The invention provides, among other features, an apparatus comprising: an accelerometer; a laser light generating module; wherein the laser light generating module provides a plane of laser light over a surface coupled to the accelerometer; at least one camera; at least one processor; and a memory; wherein the memory stores instructions, executable by the at least one processor, enabling the apparatus to ascertain an occurrence of an input event utilizing inputs from the accelerometer and a location of the input event utilizing inputs from the at least one camera.

15 Claims, 4 Drawing Sheets

COMBINED TAP SEQUENCE AND CAMERA BASED USER INTERFACE

FIELD OF THE INVENTION

The present invention relates to multi-dimensional user interfaces for electronic devices. More particularly, the present invention permits increased functionality for user interfaces by providing a combined tap sequence and camera based user interface.

BACKGROUND OF THE INVENTION

Accelerometers have been utilized in electronic devices (e.g. a personal computer (PC)) to achieve various functions. For example, an accelerometer may be used to quick park a hard drive if it senses that the machine is in free fall (e.g. upon a laptop PC being dropped by a user).

In addition to sensing free fall of a device, accelerometers can be utilized to ascertain many things related to the physical status of the device. For example, an accelerometer can be utilized to ascertain that the machine is tilted. Among the uses for accelerometers in this regard include upon determining that the device had been rotated 90 degrees, the accelerometer indicates such a tilt, therefore allowing the device to re-map the display so that the display is upright (i.e. the display is rotated 90 degrees as well). Thus, even with the device in such an orientation, a user can, e.g. read text displayed on the screen.

Others have implemented computer programs (e.g. software) such that upon a determination that the device has been physically tapped, the accelerometer can ascertain that the device had been tapped in a particular sequence. The program would allow tap sequences thus sensed to indicate different inputs (e.g. utilize the ascertained taps as a communication means). For example, if a user taps the device twice, the device does one thing (e.g. executes some function); if a user taps the device three times, the device does another thing (e.g. executes another function). This amounts to a sort of Morse code to the machine as sensed through the accelerometer. However, a significant drawback to such tap sequencing is that the device is not enabled, via the accelerometer or any other known means, to determine where upon the device that the user has tapped.

Accordingly, a need has arisen to address the shortcomings associated with the conventional arrangements discussed above.

SUMMARY OF THE INVENTION

The instant invention includes an apparatus, method and program storage device providing a combined tap sequence and camera based user interface.

In summary, one aspect of the invention provides an apparatus comprising: an accelerometer; a laser light generating module; wherein the laser light generating module provides a plane of laser light over a surface coupled to the accelerometer; at least one camera; at least one processor; and a memory; wherein the memory stores instructions, executable by the at least one processor, enabling the apparatus to ascertain an occurrence of an input event utilizing inputs from the accelerometer and a location of the input event utilizing inputs from the at least one camera.

Furthermore, an additional aspect of the invention provides a method comprising: providing a plane of laser light over a surface coupled to an accelerometer; ascertaining an occurrence of an input event utilizing inputs from the accelerometer; and ascertaining a location of the input event utilizing inputs from at least one camera.

A further aspect of the present invention provides a program storage device readable by machine, tangibly embodying a program of instructions executable by the machine to perform a method, the method comprising: providing a plane of laser light over a surface coupled to an accelerometer; ascertaining an occurrence of an input event utilizing inputs from the accelerometer; and ascertaining a location of the input event utilizing inputs from at least one camera.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
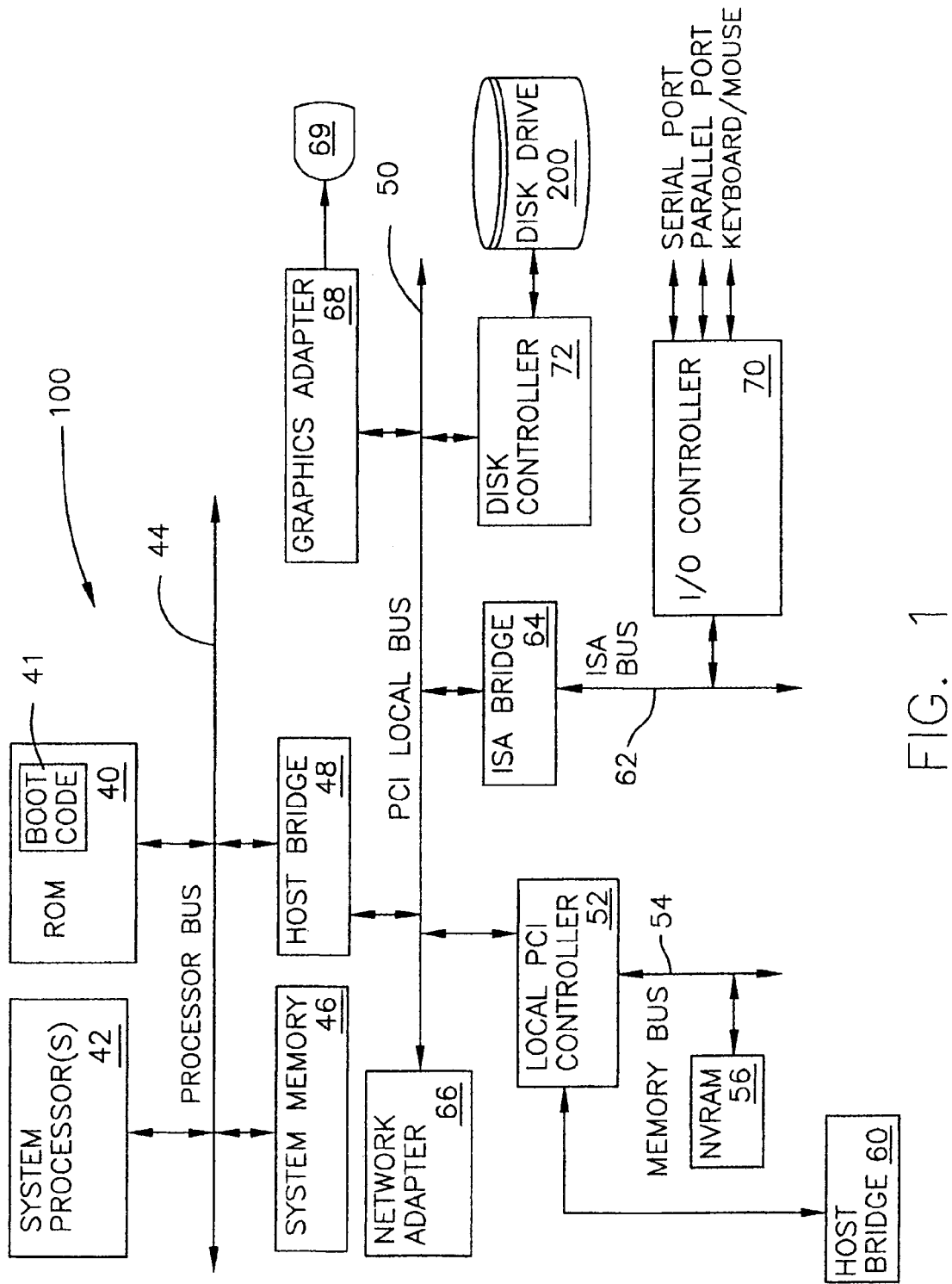
FIG. 1 is a block diagram of a computing system according to one embodiment of the invention.

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the figures herein, may be arranged and designed in a wide variety of different configurations in addition to the described presently preferred embodiments. Thus, the following more detailed description of the embodiments of the apparatus, system, and method of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided, to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of devices, systems, processes, etc. that are consistent with the invention as claimed herein.

The following description begins with a general recapitulation of the known problems of existing arrangements and the solutions provided by the instant invention. The description will then turn to a more detailed description of preferred embodiments of the instant invention with reference to the accompanying drawings.

As discussed above, accelerometers may be utilized for tap sequencing. That is, a user may tap a sequence upon the device and, via sensing that the device has been tapped, the device is enabled to ascertain a sequence for the taps and use that sequence as a communication. Based upon this communication, the device is enabled to execute functions. However, as discussed above, the accelerometer cannot ascertain where upon the device the taps have taken place, thus limiting the usefulness of such tap sequences as a means of communicating or interfacing with the device.

Existing touch screen technology has recently been improved upon by utilizing screens/surfaces coupled with IR (Infrared) cameras to allow for easier operation via a "virtual touch screen". Some useful background information on this base concept is provided in the following co-pending and commonly assigned U.S. patent application Ser. No. 12/325,255, filed concurrently herewith on Nov. 30, 2008; and U.S. application Ser. No. 12/251,939, filed on Oct. 15, 2008; both of these applications are herein incorporated by reference as if fully set forth herein.

According to this type of touch screen (referred to hereinafter "virtual touch"), a user is enabled to accomplish touch screen functions (e.g. entering an ATM pin) without using capacitative/resistive type sensors. Laser light (e.g. infrared (IR)) is provided just above the keyboard and/or display screen to spray (provide) a plane of IR light about a quarter of an inch above the keyboard or the display itself.

Along with the provision of a plane of laser light, there is also provided at least one IR sensitive camera (e.g. one in each of the upper right and the upper left corners of the screen housing). The lasers spray an IR plane of light across the screen, hovering over the screen, and the cameras (roughly co-located with the IR light source) look across the screen. With an IR camera that measures distance based on the intensity of a reflection, mapping of a user's hand interactions with the plane of laser light is accomplished. Normally, the cameras do not detect/sense anything because there is nothing to reflect the laser light of the plane. However, if a user breaks the plane of laser light (e.g. by placing one or two fingers near the screen), the camera(s) detects that the plane of laser light is broken or interrupted.

The cameras can detect that the user has broken the beam/plane of laser light by measuring finger reflection directly. It should be noted that the finger is tracked directly by the camera and the camera does not track the rim reflection shape blocked by the finger. Thus, there is no need for a reflective rim around the screen. The cameras detect that the user has broken the beam of IR light and provide data (regarding an angle utilized to calculate where the beam was broken, e.g. where upon the screen the user has touched). Using that data, the virtual touch screen system can distinguish two fingers placed near the screen or touching the screen (i.e. locate X, Y coordinates for two separate fingers simultaneously placed near the screen).

This type of virtual touch screen is well adapted for conducting multi-touch activities (e.g. expanding and minimizing pictures, etc.). For example, if a user takes two fingers and as moves them out, the picture enlarges. If a user takes the two fingers and moves them in, then the picture gets smaller. There are a number of software packages that are enabled to support multi-touch functionality; for example MICROSOFT WINDOWS 7 has multi-touch compatible software embedded in it to handle such multi-touch inputs.

According to one embodiment of the instant invention, a system is provided that enables an electronic device (e.g. a laptop or desktop PC) to ascertain not only that the device has been tapped by a user, but also to allow the device to ascertain where upon the device that the user has tapped. The system provides an accelerometer operably coupled to the device. The system provides a plane of laser light that can be sensed by cameras (e.g. IR cameras mentioned above) over a surface that is to be tapped. The surface (e.g. of a laptop PC) is coupled to an accelerometer to enable the accelerometer to sense that the device has been tapped, or tapped in sequence.

The virtual touch screen coupled with the accelerometer, both provided by the inventive system, provide the device with information about how the device has been tapped (e.g. through sensing via an accelerometer) and with information about where the device has been tapped (e.g. through utilization of the virtual touch interface). Thus, the device is enabled not only to determine a sequence of taps, but may also determine where upon the device a tap or sequence of taps has taken place. This offers at least a great advantage in the amount and quality of information available to the device and allows for a greater area to be utilized by a user as a user interface for instructing the device via a tap sequence.

According to one embodiment of the present invention, a user is enabled simply tap his or her machine (e.g. a particular tap sequence), while having the virtual touch system inform the device where the user's fingers are (e.g. at a particular position over the keyboard, over the screen, etc.) and have the machine do something (e.g. execute a program application). The virtual touch module allows a coordinate location of the tap(s) to be input by utilizing the plane of laser light. Upon the plane of laser light being interrupted, X, Y coordinates of that interruption can be calculated.

The addition of the virtual touch system to the accelerometer system for detecting tap sequences will provide enhanced user interface area and enhanced user interface communication capabilities. In other words, a user can actually use the keyboard area itself (as well as any other portion of the device or surface covered by the plane of laser light) as part of the conventional touch input device (e.g. touch-pad arrangement) found in conventional laptops.

According to one embodiment of the instant invention, the system will be operable in multiple modes. A laptop could be used in a mode wherein the user is utilizing the conventional keyboard, touch pad, mouse, etc., without utilizing the virtual touch system for entering tap sequences. The system is capable of switching or toggling between different modes, such that the user can initiate use of the virtual touch system to permit entry of tap sequences that can be located upon various areas (e.g. of the device).

According to one embodiment, the inventive system is enabled to determine which mode the user prefers. Those skilled in the art will recognize that there are various ways for the system to accomplish this. One currently preferred way is ascertain a tap on a particular area of the device (e.g. left corner of the palm rest). Thus, the accelerometer picks up the fact that a user tapped the device. The inventive system, ascertaining the tap via the accelerometer, is also able to determine where the tap has taken place via the IR cameras. Upon a tap to a particular area being ascertained by the system (e.g. the left corner of the palm rest), the system switches into a virtual touch mode. In this mode, the system is capable of executing functions based upon the entered tap sequences in a particular location of the device. Thus, the system is capable of accepting hybrid tap sequence inputs (i.e. tap sequences supplemented with location information).

It should be noted that according to one embodiment of the present invention, the system is capable of making "active" or "hot" areas on the device anywhere, so long as that area is covered by the plane of laser light and coupled in a detectable way to the accelerometer. For example, the system can be set to make the ThinkPad® logo area appearing on a laptop an active area of the device. Thus, if the user tapped on the ThinkPad® logo, the system determines that not only has a tap been received (via the accelerometer), but the tap took place at the ThinkPad® logo (via the virtual touch system), and thus a function could be executed (e.g. launch a help window). As another non-limiting example, a tap on the MICROSOFT WINDOWS® logo (i.e. the sticker that comes standard upon some laptop device surfaces) could launch an Internet browser window directed to the MICROSOFT WINDOWS® homepage or help page.

According to another embodiment of the instant invention, a virtual peripheral device could be enabled to interface with a conventional electronic device (e.g. a desktop computer). Any surface that is accommodated with the virtual touch system and an accelerometer is capable of acting as a virtual peripheral device. For example, a user can put the inventive system upon any surface or above any surface (e.g. on a table). Such an arrangement would provide for the table being extended into a "touch pad" capable of receiving and locating the tap(s) input by the user. Therefore, upon the user tapping the virtual peripheral device, the coupled device (e.g. desktop computer) could read email messages, start a CD music player, etc.

The description will now turn to the figures, wherein presently preferred embodiments of the invention are further described with reference thereto.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Purchase, N.Y. or a workstation computer, such as the Intellistation®, which are sold by International Business Machines (IBM) Corporation of Armonk, N.Y.; however, as will become apparent from the following description, the present invention is applicable to operation by any data processing system.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

Figure 2:
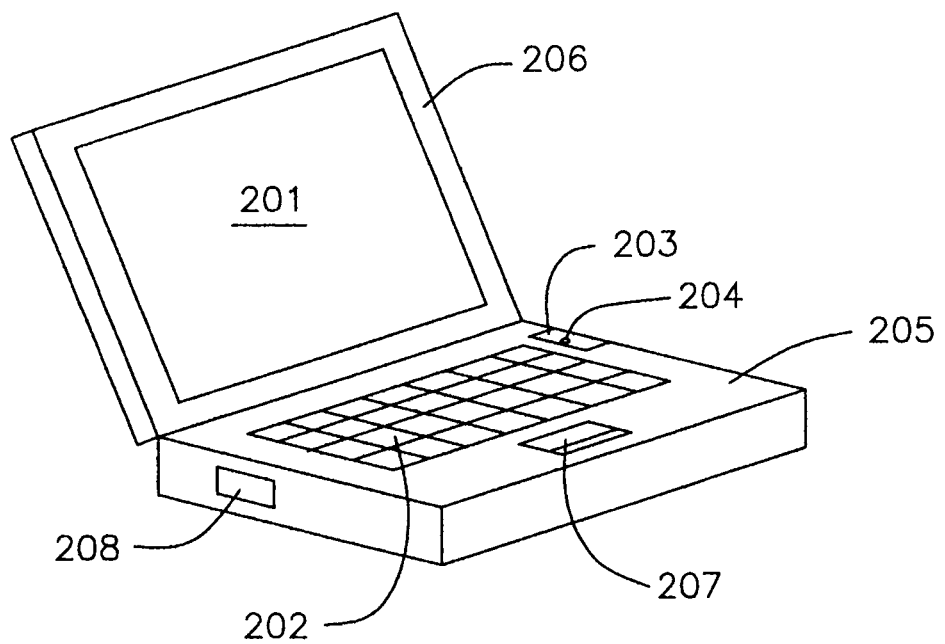
FIG. 2 provides a view of an electronic device having a tap sequence and camera enabled user interface according to one embodiment of the invention.

FIG. 2 provides a view of an electronic device (200) having a tap sequence and camera enabled user interface according to one embodiment of the invention. The device (200) may be a device as substantially described in FIG. 1; however any suitable electronic device may be utilized. The device (200) includes a display housing (206), a system housing (205), a display medium/screen (201), a conventional user interface such as a keyboard (202) or a conventional type touch pad (207), laser light generating module(s) (203), at least one IR camera (204) (which can be part of the laser light generating module (s) (203)) and an accelerometer (208).

The laser light generating module(s) (203) spray a surface of the device (e.g. keyboard, liquid crystal display (LCD) screen, etc) with a plane of laser light. The surface may be any surface that the laser light generating modules are adapted to provide laser light over. However, it should be noted that the plane of laser light will not be limited in area as the traditional user interfaces (202) (207) are. Thus, the inventive device may be provided with a plane of laser light in any particular manner that the user sees fit.

Upon an interruption of the plane of laser light, provided by the laser light generating modules (203), the interruption is detected by the at least one IR camera (204). Such a detection is transformed into X, Y coordinates within the plane of laser light using an intensity of reflection (measured directly without a reflective rim) fed into the inventive system. The inventive system's processing power is utilized to interpret the input as any other user interface input (e.g. that coming from a mouse or a conventional touch pad). Upon the break of the laser light, the inventive system is enabled to detect where upon the plane of laser light the user has interrupted/broken the plane of laser light, and this corresponds to an underlying area of the device.

The accelerometer (208) enables the device to detect a tap of the device provided by the user. If the user taps the device at a surface area of the device covered by the plane of laser light, the device will be enabled to sense the tap via the accelerometer (208) and detect whereupon the device the tap has taken place via detection of the X, Y coordinates of the interruption/breaking of the plane of laser light. Therefore, the inventive system is enabled to not only detect taps or tap sequences but is additionally enabled to detect the area upon the device which the user has tapped.

Figure 3:
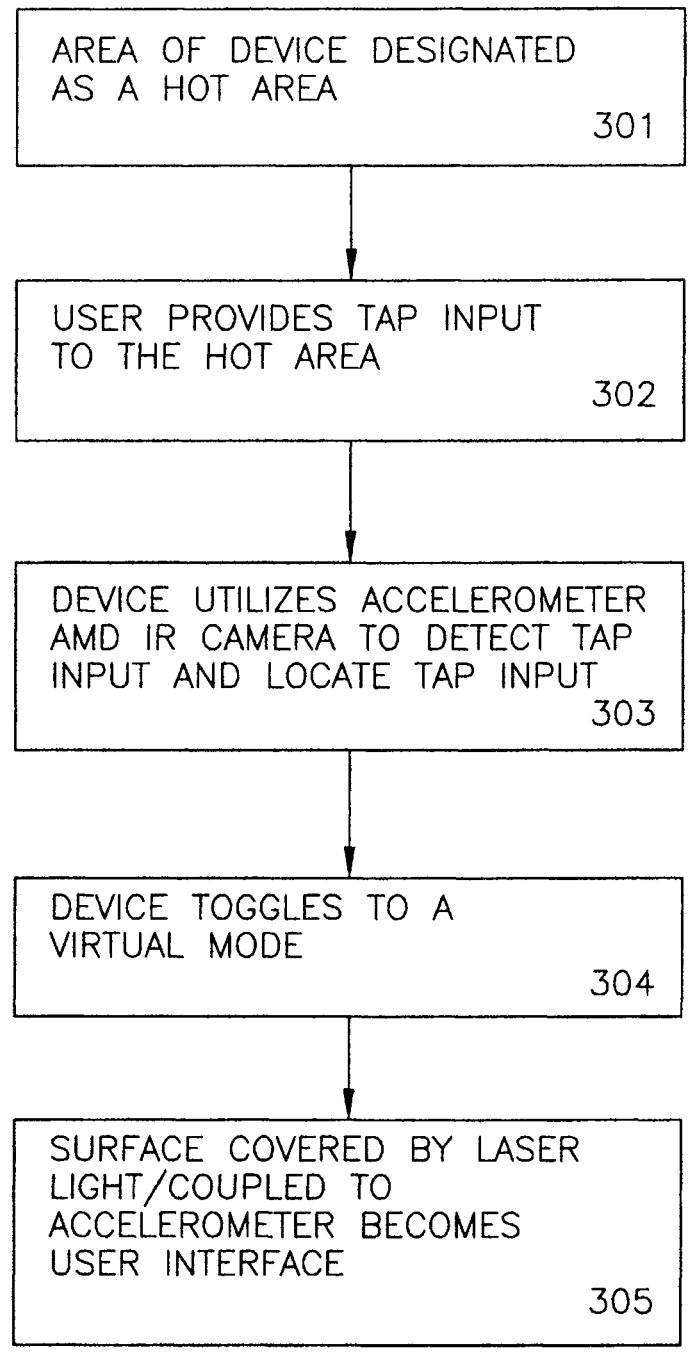
FIG. 3 provides a flow chart of accepting user inputs according to one embodiment of the instant invention.

FIG. 3 provides a flow chart of accepting user inputs utilizing the combined camera and tap sequence user interface. An area of the surface is designated as a hot area of the device (301). This hot area can be set by default or selected by the user. Upon tapping this area (302), the device is enabled, via the combined inputs from the camera (detecting the location of the tap) and the accelerometer (detecting the tap itself) (303), to switch into a virtual mode (304). Upon switching into the virtual mode, either an entire area of the surface covered by the plane of laser light (and coupled to the accelerometer) or a user selected/default area is enabled to accept tap sequence input for executing any of a number of program applications (305). Thus, the device's surface area capable of acting as a user interface is extendible by placing the device into virtual mode, enabling user inputs to be accepted from any to all of the areas covered by the plane of laser light and coupled to the accelerometer. The device may be switched out of the virtual mode in a like manner. Of course, the device is capable of continuing to accept traditional user interface inputs (e.g. mouse clicks) whether or not it is in the virtual mode.

Figure 4:
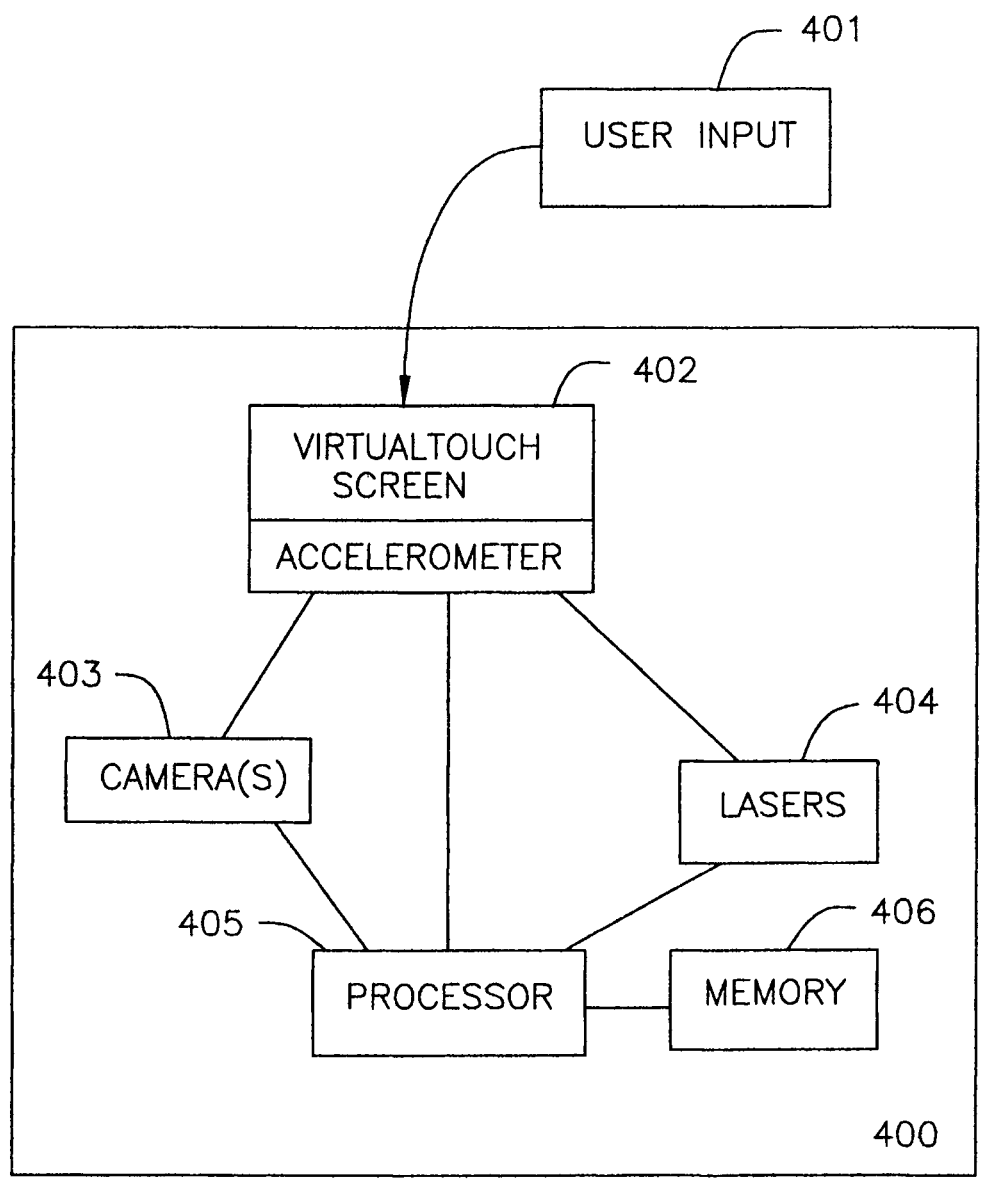
FIG. 4 is a block diagram of a computing system according to one embodiment of the invention.

FIG. 4 is a block diagram of a computing device (400) according to one embodiment of the invention. A user input (401) is made with, e.g. a finger or a stylus, onto a virtual touch screen area of the device that is coupled to an accelerometer (402). The virtual touch screen area of the device provides IR reflection (from IR laser light source (404)) inputs to the camera(s) (403). The inputs from the cameras and the accelerometer are provided to the device's processor (405), which is in communication with a system memory (406), for processing.

Thus, the inventive system is enabled to use an accelerometer to determine when a tap sequence is taking place and then, using the camera system, determine where the tap is taking place. If it is in a particular area, then the tap sequence can toggle the device between a virtual mode and a conventional mode. If it is elsewhere, it can do any of a plurality of other functions, for example putting a virtual volume slider on the keyboard and/or palm rest. Thus, any part of the keyboard and/or palm rest can turn into a volume control (which is monitored by the camera).

In brief recapitulation, according to at least one embodiment of the instant invention, systems and methods are provided for a virtual touch user interface being arranged on any suitable surface coupled to an accelerometer. Such an arrangement provides for at least the ability to locate and interpret tap sequences with great accuracy, allowing a great extension of the available user interface area of a device.

Those having ordinary skill in the art will readily understand that the inventive system, in addition to the cameras, accelerometer, and laser light producing modules, can be implemented in tangible computer program products or modules. Thus, at least part of the inventive system can be implemented in an Operating System (OS) or in a driver, similar to the way in which traditional mouse enabled inputs are currently supported.

If not otherwise stated herein, it is to be assumed that all patents, patent applications, patent publications and other publications (including web-based publications) mentioned and cited herein are hereby fully incorporated by reference herein as if set forth in their entirety herein.

Many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It is to be understood that elements of the instant invention, relating to particular embodiments, may take the form of entirely hardware embodiment or an embodiment containing both hardware and software elements. An embodiment that is implemented in software may include, but is not limited to, firmware, resident software, etc.

Furthermore, embodiments may take the form of a computer program product accessible from a computer-usable or computer-readable medium providing program code for use by or in connection with a computer or any instruction execution system.

The computer readable medium can be an electronic, magnetic, optical, electromagnetic, etc. medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers as known in the art.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated. The Abstract, as submitted herewith, shall not be construed as being limiting upon the appended claims.

What is claimed is:

1. An apparatus comprising:
an accelerometer;
a laser light generating module; wherein the laser light generating module provides a plane of laser light over a surface coupled to the accelerometer;
at least one camera;
at least one processor; and
a memory;
wherein the memory stores instructions executable by the at least one processor to:
ascertain an occurrence of an input event utilizing inputs from the accelerometer and a location of the input event utilizing inputs from the at least one camera;
determine a tap sequence of the input event using the accelerometer;
determine the input event has occurred at a predetermined sub-location within the surface using the at least one camera; and
utilize both occurrence of the tap sequence of the input event detected by the accelerometer and the predetermined sub-location detected by the at least one camera to execute a function associated with the tap sequence of the input event at the predetermined sub-location;

wherein the input event is detected as occurring at a location other than a location of a conventional keyboard and a touch pad.

2. The apparatus according to claim 1, wherein the inputs from the at least one camera comprise X, Y coordinates of an interruption of the plane of laser light.

3. The apparatus according to claim 1, wherein the instructions are further executable by the at least one processor to, upon detecting the tap sequence, execute a program application associated with the tap sequence of the input event at the predetermined sub-location.

4. The apparatus according to claim 3, wherein the program application is an Internet browser application.

5. The apparatus according to claim 1, wherein the instructions are further executable by the at least one processor to toggle to a virtual mode upon detecting the tap sequence of the input event at the predetermined sub-location.

6. The apparatus according to claim 5, wherein the the predetermined sub-location of the surface is a palm rest.

7. The apparatus according to claim 1, wherein the instructions further comprise:
   instructions for designating a predetermined area of the surface; and
   instructions for, responsive to receipt of combined inputs in the predetermined area in the form of tap input as detected by an accelerometer and location input, associated with the tap input and as detected by the at least one camera, switching to a virtual mode in which tap sequence input is accepted to execute functions on the apparatus if provided within the predetermined area of the surface.

8. The apparatus of claim 1, wherein the input event is detected by the camera as occurring within a palm rest.

9. A method comprising:
   providing a plane of laser light over a surface coupled to an accelerometer;
   ascertaining an occurrence of an input event utilizing inputs from the accelerometer;
   ascertaining a location of the input event utilizing inputs from at least one camera;
   determining a tap sequence of the input event using the accelerometer;
   determining the input event has occurred at a predetermined sub-location within the surface using the at least one camera; and
   utilizing both occurrence of the tap sequence of the input event detected by the accelerometer and the predetermined sub-location detected by the at least one camera to execute a function associated with the tap sequence of the input event at the predetermined sub-location;
   wherein the input event is detected as occurring at a location other than a location of a conventional keyboard and a touch pad.

10. The method according to claim 9, wherein the inputs from the at least one camera comprise X, Y coordinates of an interruption of the plane of laser light.

11. The method according to claim 10, further comprising: upon detecting the tap sequence, executing a program application associated with the tap sequence of the input event at the predetermined sub-location.

12. The method according to claim 11, wherein the program application is an Internet browser application.

13. The method according to claim 10, further comprising: upon detecting the tap sequence of the input event at the predetermined sub-location, toggling to a virtual mode.

14. The method according to claim 13, wherein the predetermined sub-location of the surface is a palm rest.

15. A non-transitory program storage device readable by machine, tangibly embodying a program of instructions executable by the machine to:
   provide a plane of laser light over a surface coupled to an accelerometer;
   ascertain an occurrence of an input event utilizing inputs from the accelerometer;
   ascertain a location of the input event utilizing inputs from at least one camera;
   determine a tap sequence of the input event using the accelerometer;
   determine the input event has occurred at a predetermined sub-location within the surface using the at least one camera; and
   utilizing utilize both occurrence of the tap sequence of the input event detected by the accelerometer and the predetermined sub-location input detected by the at least one camera to execute a function associated with the tap sequence of input event at the predetermined sub-location;
   wherein the input event is detected as occurring at a location other than a location of a conventional keyboard and a touch pad.

* * * * *